March 1, 1949.  S. RUBEN  2,463,316
ALKALINE DRY CELL WITH PERMANGANATE CATHODE
Filed Jan. 29, 1945
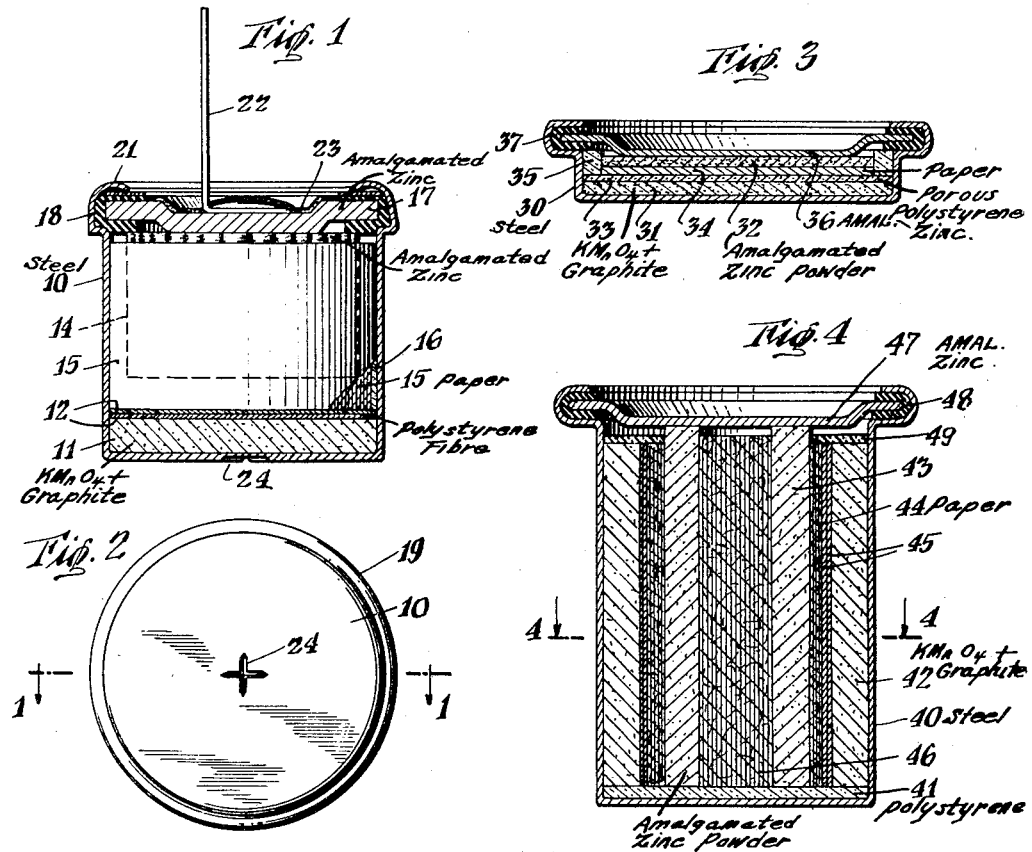
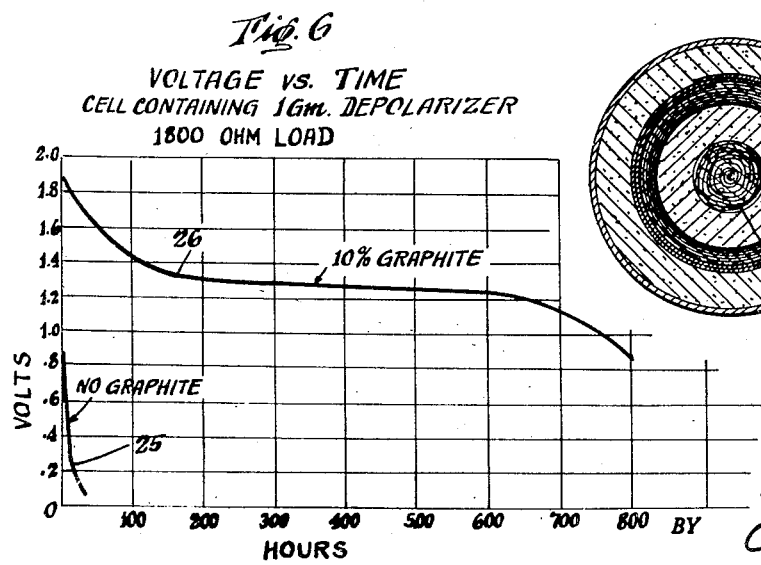
INVENTOR.
Samuel Ruben
BY
ATTORNEY Patented Mar. 1, 1949

2,463,316

UNITED STATES PATENT OFFICE 2,463,316

ALKALINE DRY CELL WITH PERMANGANATE CATHODE

Samuel Ruben, New Rochelle, N. Y.

Application January 29, 1945, Serial No. 575,090

18 Claims. (Cl. 136—107)

1

This invention relates to primary cells of the alkaline type. In its preferred embodiment it relates to hermetically sealed dry type alkaline primary cells.

An object of the invention is to improve primary cells and the electrodes thereof.

Other objects of the invention will be apparent from the description and claims.

Figure 1 is sectional view of a sealed alkaline dry cell embodying features of the invention;

Figure 2 is a bottom view thereof;

Figure 3 is a section of a flat type cell;

Figures 4 and 5 are longitudinal and transverse sections of another cell construction; and Figure 6 is a graph showing curves of primary cell voltage versus time.

The present invention contemplates a primary cell embodying a cathode formed of a depolarizer composition using ionically conductive crystals, particularly an alkali metal permanganate, intimately mixed with a conductive material. The invention also contemplates features of cell construction which facilitate effective use of the depolarizer and other cell materials. Other aspects of the invention will be evident from the following description and claims.

Referring to the drawings Figures 1 and 2 show a primary cell comprising a steel cup or container 10 in the bottom of which is pressed a pellet 11 of depolarizer composition.

In the preferred embodiment of the present invention the depolarizer composition 11 is an intimate mixture of potassium permanganate (KMnO$_4$) and graphite so as to produce an electrically conductive cathode element. In order to obtain the best results the graphite particles should be finer than the permanganate particles and the two should be intimately mixed or ball milled together so that the KMnO$_4$ particles are substantially coated with a graphite film. The permanganate should be as pure as possible and finely divided. Micronized graphite provides a very fine graphite for mixing with it. While the proportions of graphite may be varied over a considerable range the most suitable compositions contain 1 to 50% graphite and 10% graphite is preferred, although the specific application of the cell may determine the preferred graphite amount. The composition is compacted to a dense body, a pressure of about 20,000 pounds per square inch being advisable. The ionic conductivity of solid potassium permanganate crystal is too low to allow its functioning without graphite as a depolarizer with a finely divided mixture compressed into a dense mass.

2

While graphite is the preferred conductive material other finely divided conductive materials may be substituted for it, or mixed with it, such as other forms of carbon, metals such as iron, silver and the like.

The depolarizer should preferably be treated to reduce any tendency for rise in internal resistance of the cell, particularly under shelf life conditions. This can be accomplished by treating the depolarizer with a non-reactive water-repellent material. This reduces any tendency the electrolyte may have to loosen the grains of the compressed depolarizer pellet but does not prevent contact of the electrolyte with the surface of the depolarizer body. Pure white mineral oil is a satisfactory repellent. It may be introduced after the depolarizer has been pressed into the container by adding a small amount of oil over the surface, then applying a rather high vacuum to the unit to allow the oil to penetrate between the grain boundaries of the material. The unit is then drained of excess oil while heated to 60° C. and the surface of the depolarizer is wiped with absorbent tissue free of all visible oil film. Another suitable material is paraffin which can be introduced as a 10% solution in xylol. In this case, after draining and wiping the unit should be baked in draining position at about 70° C. for two hours to evaporate the xylol. Other repellents can also be used, for example, the coal tar oils and waxes. The water repellent material apparently stops or reduces the capillary absorption of electrolyte into the depolarizer but does not break the conductive contact between grains of the depolarizer. It is also possible to introduce the repellent by milling it together with the depolarizer mix before pressing. Only a very small quantity is required.

A porous electrolyte-permeable barrier layer is disposed over the top surface of depolarizer 11. The preferred barrier consists of one or more porous discs 12 of a non-oxidizable material, preferably fibrous polystyrene. These may be punched from a 5 mil sheet and then pressed into the cup on top of the depolarizer. Other suitable organic non-oxidizable materials, such as fibrous nylon sheet etc., may be used. Other barriers which are suitable are: cellophane, dialysis parchment paper, a pressed disc of magnesium silicate or magnesium hydroxide powder or a mixture of both, or of ceramic powder. These are pressed into the cup simultaneously with pressing of the depolarizer or as a subsequent operation. One disc of polystyrene fibre next to the depolarizer covered with a disc of parchment paper is also satisfactory. It is important that an inert inorganic barrier or non-oxidizable organic barrier be used in contact with the permanganate-graphite electrode to avoid surface reduction of the permanganate.

The anode assembly for the cell comprises a roll of corrugated zinc foil 14 interleaved with a double layer 15 of porous paper. The zinc foil edge extends beyond the paper slightly at one end and the paper extends beyond the zinc at the other end of the roll. At least one complete turn of paper encloses the outermost turn of zinc at the outside of the roll. An impervious insulating sleeve 16 of polystyrene or paper impregnated with polystyrene or other alkali-resistant insulating material encloses the roll and holds it assembled and insulated from the walls of container. A suitable method of making this anode assembly is shown and described in my co-pending application Serial No. 513,687, filed December 10, 1943, now Patent No. 2,422,046 dated June 10, 1947.

The anode roll is impregnated with an alkaline electrolyte solution and the zinc foil is amalgamated with mercury in the same operation. Anode rolls are placed in a flat bottom dish with the zinc end up and the electrolyte is poured into the dish slowly allowing the electrolyte to be drawn up into the rolls by capillarity. The porous paper absorbs the electrolyte and swells into the space afforded by the corrugations of the zinc. Electrolyte is added to cover the rolls and then a measured quantity of mercury is placed on top of each roll in contact with the zinc. A suitable proportion of mercury is 5 to 20% of the weight of the zinc. The dish is then placed in an oven at 60° C. for several hours or until amalgamation of the zinc foil surface is substantially complete.

The rolls are then drained and moderate vacuum applied to remove entrapped gas bubbles. An impregnated anode in this condition is then placed in the container 10 with the projecting paper end in contact with the less porous polystyrene discs 12 which absorbs some of the electrolyte from the projecting paper end and also prevents contact of the paper with the depolarizer disc. In the course of operation ionic migration of the electrolyte further impregnates the cathode pellet.

An amalgamated zinc top disc 17 of pie-pan shape is placed in the mouth of the container 10 with its depressed center in contact with the projecting zinc foil 14 of the anode roll. A neoprene grommet ring 18 encloses the edge of disc 17 and rests on a shoulder 19 formed in the container wall. A flat steel ring or washer 20 is placed over the grommet and the free edge 21 of the container is turned or spun down over the top of the washer to place the grommet under compression and seal the cell.

If desired the grommet can be sealed to the surface of the zinc disc with neoprene cement to further insure against electrolyte creepage. A terminal tab 22 is soldered or spot welded to the center of the top disc and then the entire exposed zinc surface is sprayed or painted with an air-excluding lacquer 23, such as a mixture of hydrogenated rosin plasticized with mineral oil.

The preferred electrolyte is a solution of potassium hydroxide which has been substantially saturated with zinc oxide by heating in the presence of excess zinc oxide and then filtering. A solution containing about 38% KOH and 6.4% ZnO is very satisfactory although the concentration can be varied over a wide range. For most practical applications the KOH amounts to about 20% to 50% of the solution with sufficient ZnO to saturate the solution. This electrolyte and its advantages are described more fully in my co-pending application Serial No. 486,367, filed May 10, 1943, as well as Patent No. 2,422,046 above referred to.

Other electrolytes can be used in the cell, especially where it is intended for use at low temperatures, such as straight solutions of KOH, NaOH or LiOH or mixtures of these.

In some cases it may be necessary or desirable to provide venting means, which are normally closed but which will relieve gas pressure, should any gas develop after complete use of the depolarizer. One convenient venting arrangement is illustrated in Figures 1 and 2, which comprises a pair of crossed chisel grooves 24 on the bottom of the container which do not completely penetrate the wall. The cell is therefore completely sealed but if gas pressure should develop the cross will open up sufficiently to permit escape of the gas. Another method is to amalgamate the zinc top to such an extent as to become brittle so that if an excess gas pressure is had after complete use of the depolarizer, any bulging caused by the gas pressure will cause cracks to appear and venting takes place through the cracks. Still another method of venting is to use a porous oil impregnated sealing grommet of neoprene or other suitable inert resilient material in a ring shape such as shown at 18.

Figure 6 is a graph showing curves of voltage versus time under load obtained with cells of the construction described having a depolarizer of $KMnO_4$ mixed with 10% micronized graphite, and also without graphite. The cells had a diameter of .52 inch and were ⅝ inch high. The zinc anodes were each formed of 2 mil zinc foil corrugated with 2 mil deep corrugations the corrugated foil strips being $\frac{7}{32}$" wide and 13" long. The foil is wound up with two 4 mil porous paper spacers ⅜" wide. Each cell used 1 gram of $KMnO_4$ in the depolarizer electrode. The depolarizer in each case was formed into a pellet and compressed into the bottom of the can at 20,000 pounds per square inch. The paper spacers were impregnated with .85 gram of electrolyte containing 38% KOH and 6.4% dissolved $ZnO_2$. The barrier 12 consisted of two 5 mil porous polystyrene fibre discs.

It will be noted from the graph curve 25 that the voltage of the cell having no graphite in the depolarizer fell off very rapidly from the initial voltage of less than .9 volt to less than .1 volt due to lack of sufficient ionic conductivity in the pellet of $KMnO_4$ alone. The cells having 10% of graphite in the depolarizer all had an initial voltage of 1.88 at a 1 mil load and after an initial drop maintained fairly constant voltage for many hours as shown by curve 26.

Figure 3 shows a flat cell construction comprising a shallow steel cup 30 containing a potassium permanganate-graphite depolarizer cathode 31 and a pressed zinc powder anode 32. The depolarizer composition 31 is pressed in the bottom of the container 30 and a barrier disc 33, which may be porous polystyrene dialysis parchment paper, or magnesium hydroxide, for example, is pressed on top of it. An insulating sleeve ring 35 is set on the barrier and against the side wall of the cell. This may be of polystyrene or other alkali resistant pliant material.

One or more porous paper discs 34 are impregnated with electrolyte and laid on the barrier inside the sleeve 35. Instead of paper, element 34 may be a porous disc of pressed polystyrene fibres. The anode comprises a disc pressed from iron-free zinc powder which has been amalgamated with 5 to 15% of mercury. Amalgamated zinc top 36 presses against the top of the anode and holds it tightly against paper 34. The top 36 is sealed in the mouth of cup 30 by neoprene grommet 37 which is compressed against it by the enclosing edge of the container.

Figures 4 and 5 illustrate a cylindrical electrode construction in a primary cell embodying other features of the present invention. The deep steel container 40 has a liner disc 41 of polystyrene on its bottom. Upon this rest a group of concentric cylinders. The outer cylinder 42 is of pressed $KMnO_4$-graphite composition and is fitted or pressed rather tightly against the cylindrical can wall.

The anode comprises a pressed amalgamated zinc powder cylinder 43 which stands slightly higher than the depolarizer electrode. Between the anode 43 and the depolarizer cathode 42 is a spacer 44 comprising 40 mils of porous paper wound and two layers 45 of porous sodium silicate treated paper.

Instead of layers of dissimilar materials, the entire spacer can be of a compressed absorbent material such as a pressed cylinder of a mixture of magnesium hydroxide and magnesium silicate, polystyrene fibres or a ceramic material.

The hollow interior of the anode is filled with a wad or roll 46 of porous paper. The electrolyte is added to this roll and quickly passes through the porous anode and spacers 44 and 45 by capillary action and even to some extent into the depolarizer to effect uniform distribution of electrolyte. No excess free flowing electrolyte is allowed to remain.

The amalgamated zinc top 47 is pressed against the top end of anode cylinder 43 and is sealed in the mouth of the container by neoprene grommet 48. It will be noted that the length of the cell can be varied without changing the ratio of the anode and cathode volumes or surfaces.

Using a KOH electrolyte saturated with zinc oxide (as potassium zincate) in the primary cell of the present invention it is believed that the following expresses the cell reactions, although it is not intended that applicant be limited thereby:

*Anode*

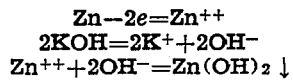

$$Zn - 2e = Zn^{++}$$
$$2KOH = 2K^+ + 2OH^-$$
$$Zn^{++} + 2OH^- = Zn(OH)_2 \downarrow$$

*Cathode*

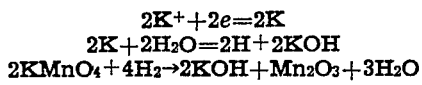

$$2K^+ + 2e = 2K$$
$$2K + 2H_2O = 2H + 2KOH$$
$$2KMnO_4 + 4H_2 \rightarrow 2KOH + Mn_2O_3 + 3H_2O$$

The zinc hydroxide is precipitated on the anode forming a coating thereon. By using an anode of large surface area as set forth in my above mentioned applications the coating never reaches a thickness where it will interfere with the useful operation of the cell until the depolarizer has been consumed. For maximum cell life the zinc surface area should be preferably at least 4 square inches per gram of the permanganate-10% graphite depolarizer.

It will also be noted that the electrolyte is constantly regenerated so that only a small quantity is necessary to the continued functioning of the cell.

The cell of the present invention has a current capacity of about 2½ times that of a cylindrical Leclanche dry cell of similar volume at a drain such as used in hearing aid B-batteries, for instance 1 ma., as well as a much higher voltage.

The cells described herein are found to have a still longer life on intermittent service than on continuous use at the higher drains. They appear to recuperate and return to higher voltage during periods of non-use.

It is of importance in avoiding local action for the zinc used for the anode to be substantially pure. The iron content particularly should be kept low, preferably below .003%. Other metals such as copper and tin should be kept below this proportion.

The barrier layer between the cathode and the paper being ionically permeable permits cell operation but substantially prevents migration of compounds from the depolarizer toward the anode. The barrier prevents direct contact between the paper and the cathode. In some cases, where life requirements are not too severe, the barrier may be eliminated and the porous paper spacer kept at a thickness of at least 20 mils, in two or more layers to reduce the possibility of direct conductive paths.

The cell contains no free-flowing or freely-circulating electrolyte, as a result of keeping the weight ratio of electrolyte to paper between 3:1 and 5:1. This factor further restricts travel of compounds to the anode where they would cause deleterious local action and is one of the most basic factors necessary for long shelf life.

In relation to the depolarizer the amount of electrolyte within the cell may be about 0.4 gram per gram of depolarizer in the flat and cylindrical structures and about 0.8 gram electrolyte per gram of depolarizer in the coiled foil anode type.

While potassium permanganate is the preferred cathode-depolarizer material the other alkali metal permanganates such as sodium, lithium, rubidium or cesium permanganates can be used. In each case it is preferable that the electrolyte carry the same alkali radical as the depolarizer.

In the manufacture of the cell it is important that the permanganate and graphite be substantially compressed as to produce an electrically conductive mass. An excess of electrolyte is to be avoided.

There should be only sufficient electrolyte in the spacer to allow conduction and ionic migration but insufficient to allow dissolving of the permanganate by circulation or flow of the electrolyte. If the permanganate is used with a wet or free flowing electrolyte construction it would rapidly dissolve and decompose into the electrolyte and adequate shelf life would not be possible. The permanganates described are all water soluble.

The barrier is of considerable importance. It should permit only ionic conduction, it should limit circulation of the electrolyte and it should have substantially no reducing action on the permanganate, particularly where high temperature operation of the cell is to be encountered.

While specific embodiments of the invention have been described, it is intended to cover the invention broadly within the spirit and scope of the appended claims.

What is claimed is:

1. An alkaline dry cell comprising an amalgamated zinc anode, an immobilized alkaline electrolyte and a cathode comprising a solid electrolytically dissociable oxygen-yielding permanganate and a more conductive material admixed therewith, a spacer between said anode and cathode at least part of which comprises a finely porous barrier in contact with said cathode, said barrier being non-oxidizing in contact with the permanganate and being inert with respect to the alkaline electrolyte, said barrier preventing migration of particles from the cathode to the anode but permitting ionic conduction therethrough.

2. The dry cell as described in claim 1 characterized in that the barrier comprises porous styrene.

3. The dry cell as described in claim 1 characterized in that the barrier comprises fibrous styrene.

4. An alkaline current-producing cell comprising an amalgamated zinc anode, a cathode comprising an intimate mixture of an electrolytically dissociable oxygen-yielding permanganate and a more conductive material, a porous spacer between said anode and cathode and an electrolyte comprising an alkaline solution impregnating said spacer, that part of the spacer adjacent the zinc comprising a cellulose electrolyte absorbent material and that part of the spacer adjacent the cathode comprising a material substantially non-oxidizing in contact with said permanganate.

5. An alkaline dry cell comprising an amalgamated zinc anode, an alkaline electrolyte and an electrolytically dissociable oxygen-yielding permanganate cathode, a porous electrolyte absorbent paper spacer in contact with the anode and an insulating non-cellulosic substantially non-oxdizing porous spacer in contact with said permanganate and with said paper spacer.

6. A primary cell comprising a zinc anode, a cathode comprising an intimate mixture of an alkali metal permanganate with a finely divided conductive material and a material selected from the group consisting of liquid and liquefiable water-repellent materials dispersed between the grain boundaries of said mixture, said water-repellent material being capable of substantially preventing absorption of the electrolyte into the cathode, a porous spacer between said anode and cathode and in contact therewith, and an alkaline electrolyte absorbed in said spacer, said cell being characterized by the absence of any freely flowing electrolyte not held in said spacer.

7. A primary cell comprising a zinc anode, a cathode comprising a compressed intimate mixture of potassium permanganate with graphite and a material selected from the group consisting of liquid and liquefiable water-repellent materials dispersed between the grain boundaries of said mixture, said water-repellent material being capable of substantially preventing absorption of the electrolyte into the cathode, a porous spacer between said anode and cathode and in contact therewith, and an alkaline electrolyte absorbed in said spacer, a container for said anode, cathode and electrolyte impregnated spacer, conductive terminals comprising part of said container and connected respectively to said anode and cathode, and sealing means insulating said terminals from each other and sealing said cell.

8. A primary cell comprising a zinc anode, a cathode comprising solid potassium permanganate intimately mixed with graphite of a finer particle size than that of said permanganate and a material selected from the group consisting of liquid and liquefiable water-repellent materials dispersed between the grain boundaries of the mixture, said water-repellent material being capable of substantially preventing absorption of the electrolyte into the cathode, a porous spacer between said anode and cathode and in contact therewith, and an electrolyte comprising an alkaline solution impregnating said spacer, said electrolyte being substantially saturated with alkali metal zincate and said anode having a large surface area.

9. A primary cell comprising a zinc anode, a cathode comprising solid potassium permanganate intimately mixed with graphite of a finer particle size than that of said permanganate and a material selected from the group consisting of liquid and liquefiable water-repellent materials dispersed between the grain boundaries of the mixture capable of substantially preventing absorption of the electrolyte into the cathode, a porous spacer between said anode and cathode and in contact therewith, and an electrolyte comprising an alkaline solution impregnating said spacer, said electrolyte being substantially saturated with alkali metal zincate and said anode having a large surface area, a hermetically sealed container having terminals connected to said anode and cathode respectively, enclosing said anode, cathode and electrolyte impregnated spacer, and said cell being further characterized by the absence of any freely flowing electrolyte therein.

10. A primary cell comprising a zinc anode, a cathode comprising an intimate mixture of solid potassium permanganate and a conductive material, a porous spacer between said anode and cathode and in contact therewith, and an electrolyte comprising an alkaline solution impregnating said spacer, said spacer including a porous barrier of ionically permeable material which is inert to said electrolyte and to said permanganate covering the electrolyte-engaging surface of said cathode and substantially preventing the migration of compounds therefrom toward the anode.

11. A primary cell comprising a zinc anode, a cathode comprising an intimate mixture of potassium permanganate and a conductive material, a porous spacer between said anode and cathode and in contact therewith, and an electrolyte comprising an alkaline solution impregnating said spacer, said spacer including a porous barrier of ionically permeable material which is inert to said electrolyte and to said permanganate covering the electrolyte-engaging surface of said cathode and a layer of porous paper between said barrier and said anode.

12. A primary cell comprising a zinc anode of large surface area, a cathode comprising an intimate mixture of potassium permanganate and finely-divided graphite, a porous spacer interposed between said anode and cathode and in contact therewith, said spacer comprising a barrier layer of semi-permeable material inert to said electrolyte and to said permanganate covering the electrolyte-engaging surface of said cathode and a layer of porous paper between said barrier layer and said anode, and an electrolyte impregnating said spacer comprising a solution of potassium hydroxide substantially saturated with dissolved zinc oxide.

13. A primary cell comprising a cylindrical cathode formed of an intimate mixture of potassium permanganate and a finely-divided conductive material, a cylindrical anode spaced within said cathode and substantially concentric therewith formed of a pressed cylinder of amalgamated zinc powder, a porous spacer between said anode and cathode, said spacer and anode being impregnated with an alkaline electrolyte, and said spacer including a barrier of ionically permeable material having such porosity as to substantially prevent the migration of compounds from the cathode toward the anode, said barrier being in contact with the electrolyte engaging face of the cathode.

14. A primary cell comprising a zinc anode, a cathode comprising an intimate mixture of a solid water soluble permanganate and a conductive material, a porous spacer between said anode and cathode and in contact therewith, and an electrolyte comprising an alkaline solution impregnating said spacer, said spacer including a barrier of fine porosity material which is inert to said electrolyte and to said permanganate covering said electrolyte-engaging surface of said cathode, and substantially preventing the migration of compounds therefrom toward the anode.

15. A primary cell comprising a zinc anode, a cathode comprising an intimate mixture of solid potassium permanganate with a conductive material and a material selected from the group consisting of liquid and liquefiable water-repellent materials dispersed between the grain boundaries of said mixture, an electrolyte comprising an immobilized alkaline solution between said anode and cathode and in contact therewith, said water-repellent material being capable of substantially preventing absorption of the electrolyte into the cathode, and a porous barrier of ionically permeable material which is inert to said electrolyte and to said permanganate covering the electrolyte-engaging surface of said cathode.

16. A primary cell comprising a zinc anode of large surface area, a coherent cathode comprising an intimate mixture of potassium permanganate with finely-divided graphite and a material selected from the group consisting of liquid and liquefiable water-repellent materials dispersed between the grain boundaries of said mixture, an alkaline electrolyte between said anode and cathode and in contact therewith, said water-repellent material being capable of substantially preventing absorption of the electrolyte into the cathode, a barrier layer of electrolyte-permeable material inert to said electrolyte and to said permanganate covering the electrolyte-engaging surface of said cathode, said electrolyte comprising an immobilized aqueous solution of potassium hydroxide containing a substantial quantity of potassium zincate.

17. A primary cell comprising a zinc anode, a cathode comprising an intimate mixture of a solid water-soluble permanganate with a conductive material and a water-repellent wax dispersed between the grain boundaries of said mixture, an electrolyte comprising an alkaline solution between and in contact with said anode and cathode, said water-repellent wax being capable of substantially preventing absorption of the electrolyte into the cathode, and a barrier of fine porosity material which is inert to said electrolyte and to said permanganate covering the electrolyte-engaging surface of said cathode.

18. A cathode depolarizer for alkaline primary cells comprising a substantially non-conductive solid permanganate mixed with finely divided conductive material, and a material selected from the group consisting of liquid and liquefiable water-repellent materials dispersed between the grain boundaries of the mixture, said water-repellent material being capable of preventing substantial absorption of the electrolyte into the depolarizer.

SAMUEL RUBEN.

REFERENCES CITED

The following references are of record in the file of this patent:

UNITED STATES PATENTS

| Number | Name | Date |
| --- | --- | --- |
| 298,175 | Clarke | May 6, 1884 |
| 691,611 | De Dion et al. | Jan. 21, 1902 |
| 1,090,763 | Thomas | Mar. 17, 1914 |
| 1,147,753 | Schatzel | July 27, 1915 |
| 1,338,412 | Xardell | Apr. 27, 1920 |
| 1,454,943 | Pepper | May 15, 1923 |
| 1,611,153 | Benner et al. | Dec. 21, 1926 |
| 1,874,748 | Henderson | Aug. 30, 1932 |
| 2,233,593 | Eddy et al. | Mar. 4, 1941 |
| 2,307,627 | Lawson | Jan. 5, 1943 |

FOREIGN PATENTS

| Number | Country | Date |
| --- | --- | --- |
| 16,471 | Great Britain | 1915 |
| 163,744 | Great Britain | May 30, 1921 |
| 320,916 | Great Britain | Oct. 28, 1929 |
| 493,694 | Great Britain | Oct. 12, 1938 |